United States Patent [19]

Fowler

[11] 4,011,752

[45] Mar. 15, 1977

[54] ADAPTIVE SPEED AND DIRECTION ANALYZER

[75] Inventor: William B. Fowler, Wenatchee, Wash.

[73] Assignee: The United States of America as represented by the Secretary of Agriculture, Washington, D.C.

[22] Filed: Feb. 6, 1976

[21] Appl. No.: 656,032

[52] U.S. Cl. .................................................. 73/189
[51] Int. Cl.² ....................................... G01W 1/02
[58] Field of Search ........................... 73/189, 170 A

[56] References Cited

UNITED STATES PATENTS

| | | | |
|---|---|---|---|
| 3,276,256 | 10/1966 | Rudasill et al. | 73/189 |
| 3,282,099 | 11/1966 | Kingman | 73/189 |
| 3,452,593 | 6/1969 | Lauter | 73/189 |
| 3,616,692 | 11/1971 | Keller | 73/189 |

Primary Examiner—James J. Gill
Assistant Examiner—Anthony V. Ciarlante
Attorney, Agent, or Firm—M. Howard Silverstein; David G. McConnell

[57] ABSTRACT

A device for the continuous computation of fluid velocity, the simultaneous analysis of direction of fluid motion, and the storage of both is described. Utilizing multiple sensors, the device computes average fluid velocity and direction over a selected fluid travel distance, stores the velocity data in one of several selected speed classes and stores the direction identified to the fluid sample in one of several selected direction classes. At the operator's option, the data may be stored either as velocity with the direction existent at the end of the travel period or as velocity as a function of each of the several directions selected. Low power consumption and data storage ability make this instrument suitable for use in remote, unmanned applications.

1 Claim, 8 Drawing Figures

BLOCK DIAGRAM

ADAPTIVE SPEED AND DIRECTION ANALYZER

BACKGROUND

1. Field of the Invention

This instrument is applicable to the continuous detailed analysis of the velocity and directional characteristics of fluid movement whether the fluid is air in the atmosphere, water in the ocean, or some other fluid in an environment about which data are desired. By using small fluid sample units, the averaging process of the instrument provides data approaching instantaneous monitoring of the fluid velocity and direction, which data can be stored for retrieval at a subsequent time.

2. Prior Art

Wind speed and direction at most points on the earth's surface are poorly documented with data reported on an hourly basis (although occasionally more frequently) based on instantaneous measurements at the time of observation. Typically these data are collected at airport installations or weather stations. Use of an auxiliary recording device of some type attached to the sensors may provide analog records of velocity and direction or alternatively a count of the units of wind travel may be determined from an accumulating type wind sensor.

However, installations such as described trade all detail of wind structure for the total quantity of wind travel or an average velocity over the recording period. With simultaneous use of an auxiliary recording system, some analysis of the wind structure is possible but analysis is at best difficult because of the variability of the wind flow; consequently, the relation of velocity and direction is not readily determinable. One of the reasons for this is that directions are recorded on the basis of time rather than wind flow with the result that direction during a 25-mph wind is recorded the same as during a period of calm.

A purpose of this invention is to provide a device for the continuous computation and classification of wind or other fluid velocity and direction keyed to fluid movement rather than to the recording period.

A related purpose is the elimination of the expense and effort required to reduce and correlate the data available from present devices.

Since an adequate analysis of air flow and patterns requires multiple selectively placed data installations, devices for acquiring and storing data on wind characteristics must be available at reasonable cost of construction and operation. Additionally, data collection sites may be necessary or desirable in relatively unimproved areas. In addition to the inherent problems in the form and analysis of data collected by present methods, expense of construction and operation, relatively large power requirements, and the inability to operate unattended are severe obstacles to an adequate network of conventional installations.

Thus another purpose of this invention is the development of a device with suitable data collection and storage characteristics which is inexpensive to construct, requires little power, and can operate unattended for extended periods of time.

BRIEF DESCRIPTION OF THE DRAWINGS

FIG. 2 is a diagram of the oscillator and divider.

FIG. 3 is a diagram of the counter and speed gates.

FIG. 4 is a diagram of the wind direction analysis assembly which includes the wind direction code disk, and the decode and the direction gauge as shown in FIG. 1.

FIG. 5 is a diagram of the reset and timer control.

FIG. 6 is a diagram of the memory.

FIG. 7 is a diagram of the readout.

FIG. 8 is a diagram of the signal conditioner.

SUMMARY

Although this device is compatible with fluids other than air given appropriate sensors and minor circuit adjustments, for simplicity the device will be described with air as the contemplated fluid.

Figure 1:
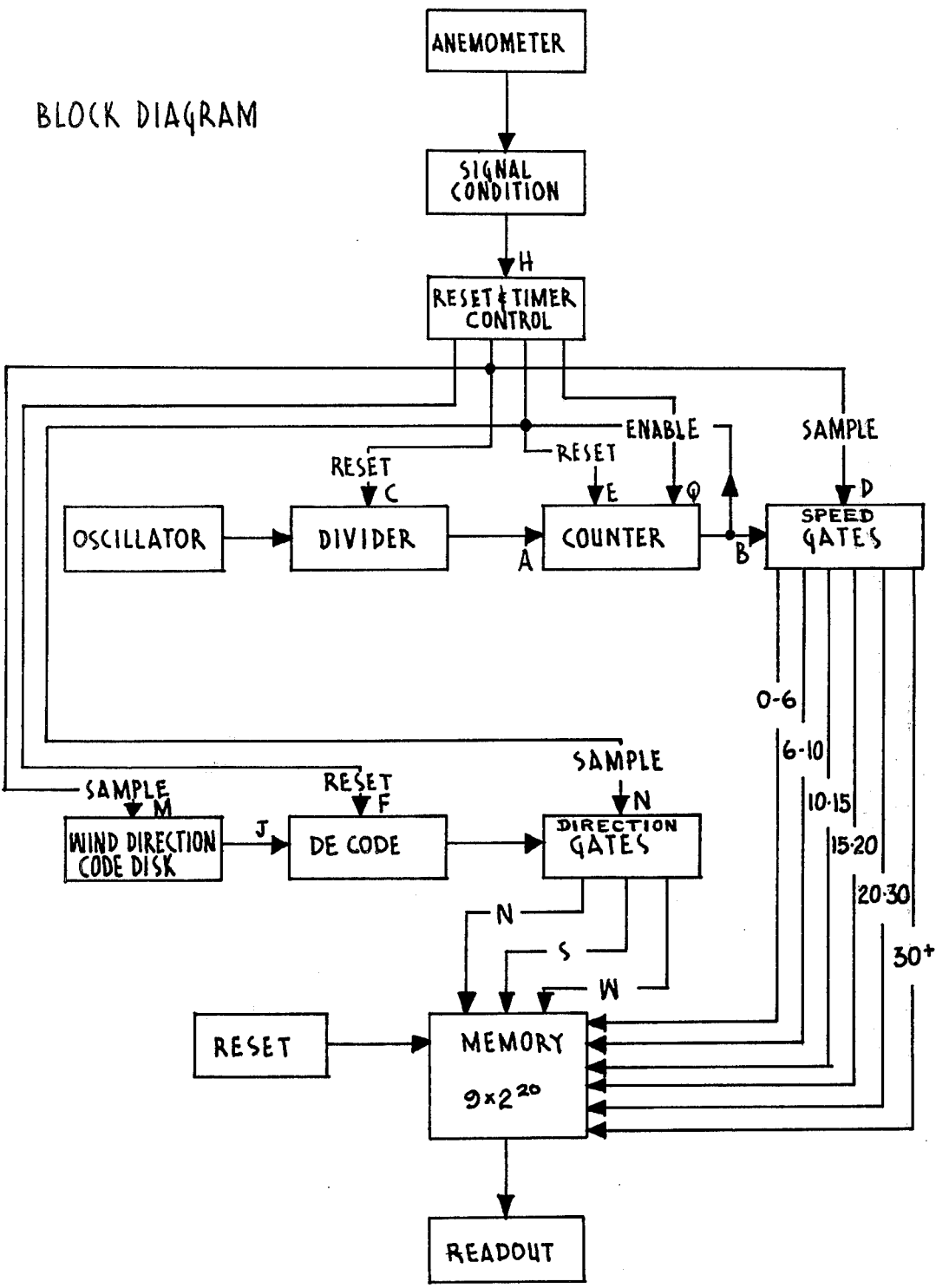
FIG. 1 is a block diagram of the invention.

A general description with reference to FIG. 1 and with a limited degree of complexity precedes a detailed explanation of the device. An anemometer provides the basic wind velocity sensor, and a wind direction sensor is contemplated in conjunction with the anemometer although the term "anemometer" will be used to refer to both sensors. If the anemometer is a contacting type that can be set to send an electrical pulse after 1/12 mile of wind travel, a signal conditioner is unnecessary. For voltage or other pulse producing anemometers a signal conditioner is necessary to order the anemometer output to a single pulse that represents 1/12 mile of wind travel. In either case the pulse representing a 1/12-mile unit of wind travel is an input H to the reset and timer control.

The reset and timer control orders and controls the various operations of the device. This includes reset and control of the counting circuitry, gate selection, and generation of pulses for accumulation to the memory.

The oscillator and divider act as the timer for the device. The oscillator operates at a frequency which upon division in the divider produces a positive level change A at the counter input. The counter than activates B each speed gate in sequence, beginning with the highest speed and progressing to the lowest. Gate selection is related to the 5-second counter advance pulse A as follows:

30+ mph — 10 seconds or less
20–30 mph — 10 to 15 seconds
15–20 mph — 15 to 20 seconds
10–15 mph — 20 to 30 seconds
6–10 mph — 30 to 50 seconds
0–6 mph — greater than 50 seconds.

The time period corresponding to each speed class is the time period required for 1/12 mile of wind travel in each of the speed spans. The outputs from the counter select the proper gate. At time 0 the 30+ mph gate is open and remains open until 10 seconds (2 pulses from the divider to the counter) have elapsed. On the second pulse the counter advances to open the second (20–30 mph) gate, on the third pulse the counter advances to the third (15–20 mph) gate, and similarly until the 50th second (10th pulse). If reset has not occured by this time, the counter disables itself and the last gate (0–6 mph) is held open until reset occurs. As is obvious from the description of the process, only one speed gate is open at any particular time.

When a pulse H arrives in the reset and timer control from the anemometer, the counter is disabled Q until the sample signal D has passed through the one open speed gate and into the memory. The divider is then immediately reset C to begin determination of the following time period. Simultaneously a pulse M samples the wind direction code disk and the signal J from the direction code disk to the decoder causes the decoder to select the proper direction gate based on the configuration in the wind direction code disk. The direction code disk contains two sliding contacts which code the wind direction into four quadrants; decoding is initiated by the sample pulse M. As with the speed gates, only one direction gate is open at a particular time. A pulse E from the reset and timer control then resets the counter and another pulse N goes through the one open direction gate into the memory. The decoder is then reset by a pulse F from the reset and timer control. All systems are then ready to repeat the process.

No wind is accumulated in the east quadrant. To determine the amount of wind in the east quadrant, the sum of the units of wind in the other three quadrants is subtracted from the total number of units of wind in the six speed classes where all wind is accumulated. In the more sophisticated optional analysis of wind speed class by direction, elimination of one direction is not possible; additionally a gate and memory cell are required for each speed class in each wind direction class.

Semiconductor memory with capacity provided by 21 binary stages for each memory cell is utilized giving a total count per cell of $2^{21}-1$ or 2,097,151. Each gate feeds one cell in the memory. Readout is through diode lamps and can be recorded on a simple punch card. Alternatively, readout and memory cell selection logic can be transported from site to site for unit interrogation. Memory is capable of being reset after readout.

The previous description illustrated the operation of the instrument with six specific speed classes and three direction classes feeding memory and a basic wind travel unit of 1/12 mile. The number of speed and direction classes may be expanded to any desired degree of detail and complexity in a manner similar to the one described, and the span of speeds or directions encompassed by each class can be varied at the same time. Similarly, the unit of wind travel used as the basic measuring unit may be selected by the operator with minor circuit adjustments. The number of cells in the memory can likewise be expanded to any desired degree.

The device described represents a departure from current wind speed and direction analyzing apparatus in that continuous computation and classification of wind velocity and direction is ordered by the instrument, and the data produced require no lengthy reduction and subsequent collation by the user. Additionally, this device is keyed to wind travel rather than time so detail of the wind characteristics is not lost as it is when averaged over a length recording period. This instrument also permits classification of the total amount and velocity of wind relative to particular directions; the quantity and speed of the wind in each direction class can be determined. The oscillator consumes almost all of the power required by the device and this consumption is so low (approximately 0.15 milliwatts) that extended use in remote field locations is possible. The memory permits data to be stored for long periods before readout is required. Finally, use of semiconductor devices permits economical construction.

These advantages are illustrated by application of this device to the gathering of data on wind patterns in mountainous areas. The data collected can then be analyzed to determine the probable location and severity of snowdrifts that can be expected in winter. Use of several such devices in selected areas would allow determination of the effect of tree stands on snow accumulation patterns. Both sets of data would be of great use in planning tree harvest, road location and maintenance, restricted travel areas and other necessary and/or desirable courses of action. Present wind devices have no capability for supplying such information. Another example of use might be to chart ocean currents over a wide area. Again, present devices are inadequate to furnish such information.

Figure 2:
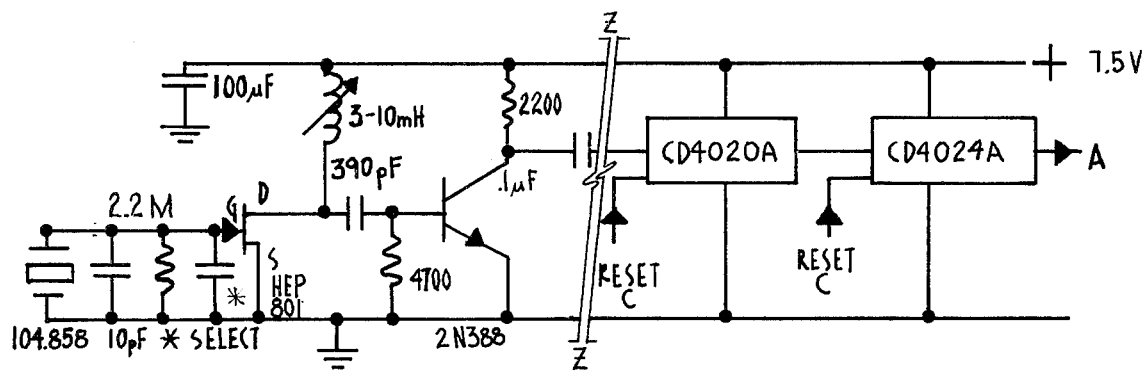
FIGS. 2 through 8, as follows, are system components and associated circuitry which are represented by the blocks in FIG. 1.

A detailed analysis of the device follows. FIG. 2 shows the oscillator and divider. The 104.858 kilohertz oscillator drives the divider chain (CD 4020 A and CD 4024 A) in which division by $2^{14}$ provides the 5-second signal (A) from the divider to the counter (CD 4017 A in FIG. 3). By varying the value of the capacitor marked with an asterisk (*), the precise time division required may be obtained.

Figure 3:
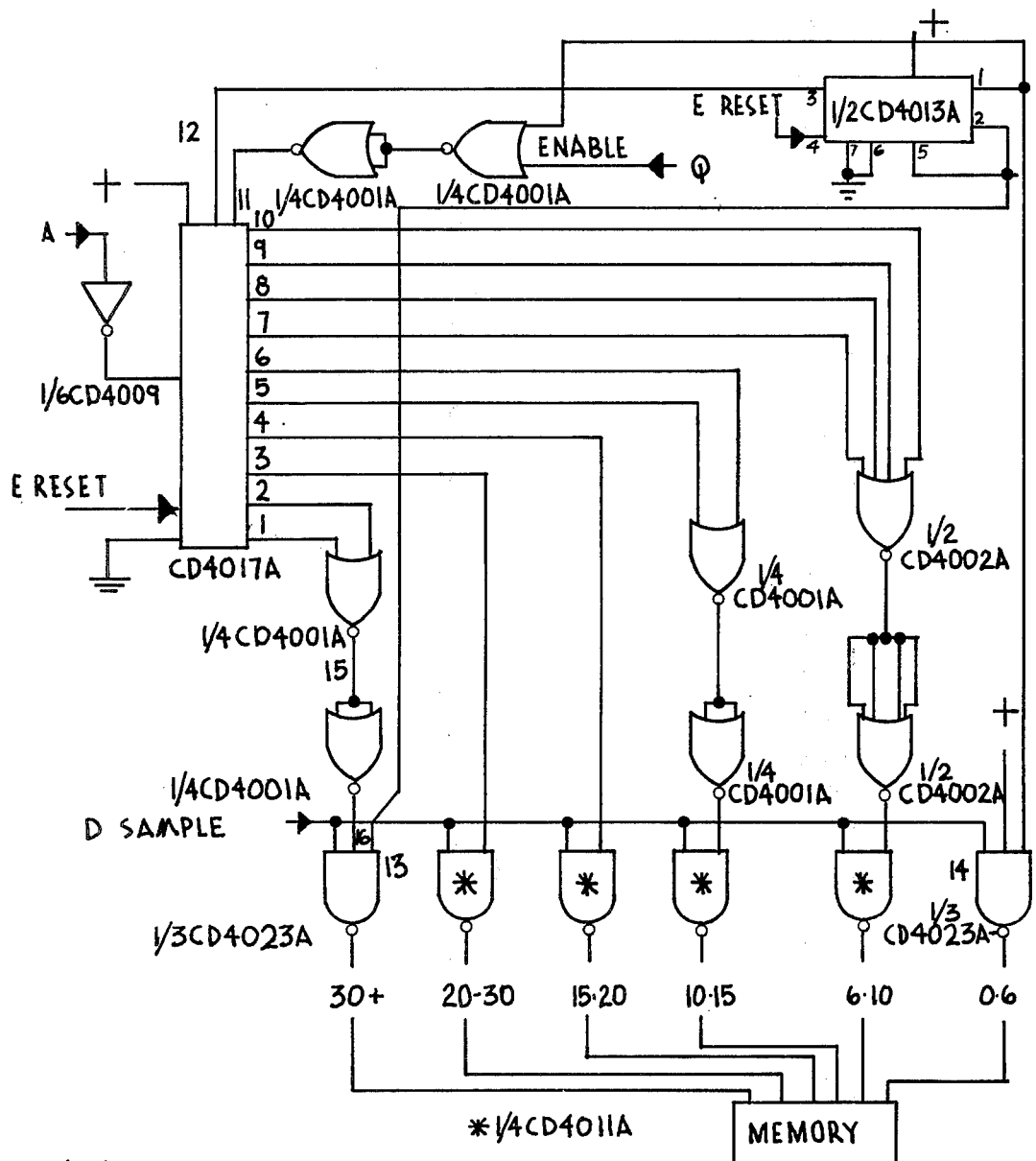

The counter and speed gates are shown in FIG. 3. The outputs of the counter (CD 4017 A) are at high logic level when active. From time 0 to time 5 seconds, the time before the first pulse arrives, only output 1 is active; at the first pulse, output 1 goes to low logic level and output 2 goes to high logic level. This sequence is repeated for each successive output until the tenth pulse from the counter through output 12 operates the ½ CD 4013 A flip-flop. When the counter reverts to its zeroth count at time 50 seconds, output 1 is activated. To channel the sample into the proper low speed gate, the ½ CD 4013 A flip-flop (pin 2) closes the ⅓ CD 4023 A gate of the 30+ mph speed class at point 13. Thus the only open gate remaining for the sample to enter is the ⅓ CD 4023 A gate (14) which corresponds to the lowest speed class. The ½ CD 4013 A pin 1 also disables the counter 11 from further gate selection until reset occurs.

As illustrated in FIG. 3, when a speed class is chosen that requires more than a single 5-second time interval multiple outputs of the counter are used for that single class. For example, the 30+ mph speed class requires 10 seconds or 2 pulses; although the counter makes an output change each 5 seconds, the 10 seconds required for the speed class are obtained by using two consecutive outputs (1 and 2). Similarly the 6–10 mph speed class uses four consecutive outputs (7, 8, 9, and 10).

Memory input requires a negative going transition. For the ⅓ CD 4023 A and ¼ CD 4011 A Nand gates to supply this negative going transition, logic requirements are that the input to these gates go to high logic level. When multiple counter outputs must be combined to produce time periods greater than 5 seconds (outputs 1 and 2 for example), the positive counter outputs are inverted to low logic level in the first ¼ CD 4001 A gate and then must be inverted in the second ¼ CD 4001 A gate to the high logic level required at the input to the ⅓ CD 4023 A Nand gate 16. Multiple gates are similarly required in each case where multiple counter outputs are required for a single speed class.

The result of the previously described counter operations is that one and only one speed class gate is open at any time. When a sample H from the anemometer arrives at the reset and timer control, a secondary enable input Q from the reset and timer control stops the counter from further gate selection until the sample D has passed through the open gate and the counter is reset by an input E from the reset and timer control. The sample D goes through the one open gate and produces a negative-going transition which is accepted into the memory. In this manner the average speed of 1/12 mile of wind travel is computed within one of several specified ranges.

Figure 4:
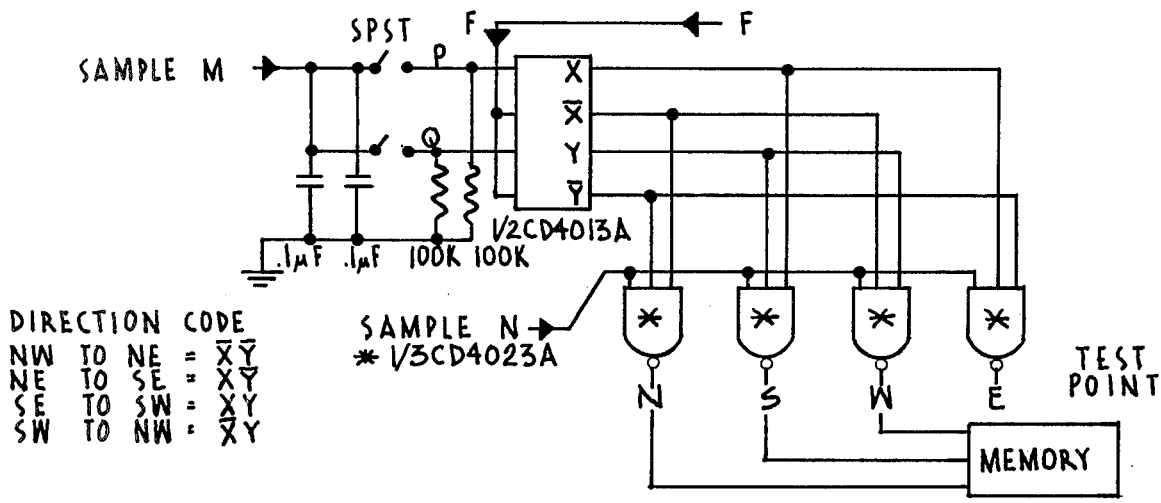

The wind direction analysis assembly is diagrammed in FIG. 4. On reset to begin a recording period, input F from the reset and timer control places pins $\overline{X}$ and $\overline{Y}$ on the ½ CD 4013 A at high logic levels and pins X and Y at low levels. The 100 kilohm resistors maintain pins X and Y at a low level in the absence of closure of either switch P or Q or both. Closure of switch P allows sample pulse M to set pin X to a high logic level and reduces pin $\overline{X}$ to a low level; similarly for switch Q and pins Y and $\overline{Y}$. Since only one pin of the pair X and $\overline{X}$ and one pin of the pair Y and $\overline{Y}$ will be at a high logic level (active), only one of the four ⅓ CD 4023 A Nand gates will have two positive level inputs and thus be open for the input of the sample N. The output of the open gate will be a negative-going output for entry into the memory. The switches P and Q are controlled by the wind direction sensor which is set to close switch P when the wind direction sensor is within the 180° angle defined by a line lying 45° relative to the north and east axes, extending through the intersection of the coordinate axes, and extending at an angle of 45° relative to the south and west axes which angle includes the east and south axes; switch Q is closed when the wind direction sensor is within the 180° angle defined by a line lying 45° relative to the east and south axes, extending through the intersection of the coordinate axes, and extending at an angle of 45° relative to the west and north axes, which angle includes the south and west axes.

Figure 5:
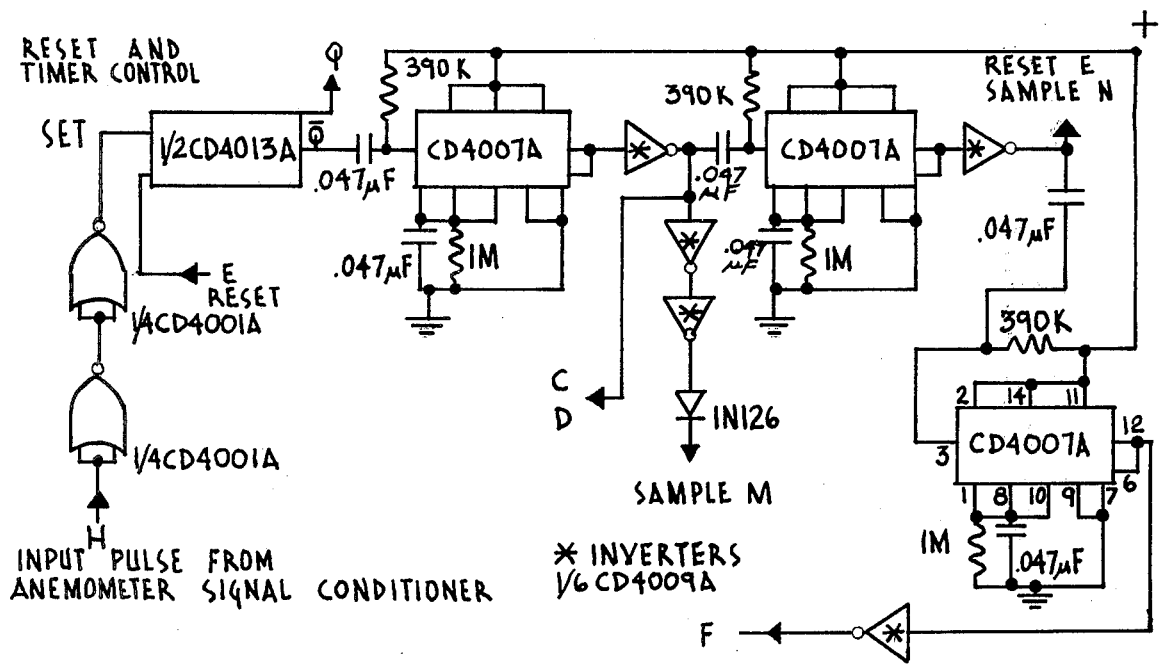

The reset and timer control, shown in FIG. 5, orders and controls all of the functions within the device. An input pulse from the anemometer is shaped and amplified with the two ¼ CD 4001 gates which pulse sets the ½ CD 4013 A. On the change of state, output at Q goes to high level to disable the counter from further gate selection, and a negative transition at $\overline{Q}$ initiates a series of sequential negative-going pulses from the three CD 4007 A devices wired as monostable oscillators; these pulses are produced when each CD 4007 A output goes low for a period of approximately 2 milliseconds. These negative-going pulses are inverted in the 1/6 CD 4009 A inverters. From the output of the first CD 4007 A, a pulse is routed to reset the divider C and act as the sample D for the speed gates and as sample M to the wind direction code disk. A pulse from the second CD 4007 A divides to reset the counter and the ½ CD 4013 A in control E and act as the sample N for the directional gates. Output from the third CD 4007 A resets the wind direction decoder F. Proper pin connections and component values are shown with the third CD 4007 A.

Figure 6:
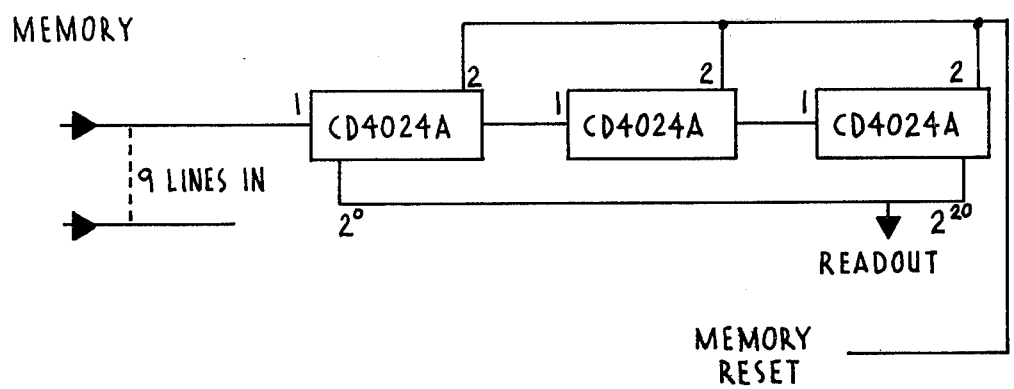

The memory, shown in FIG. 6, consists of three series-connected CD 4024 A binary counters for each memory cell thus providing capacity for 21 binary stages for each memory cell or a total count per cell of $2^{21}-1$ or 2,097,151; since in this example six speed gates and three wind direction gates feed the memory, the memory contains nine cells each with three series connected CD 4024 A binary counters. Negative transitions, from the speed and wind direction gates, appearing at the input 1 advance the count. The memory is manually reset after readout by inducing a high voltage level at pin 2 of all counters.

Figure 7:
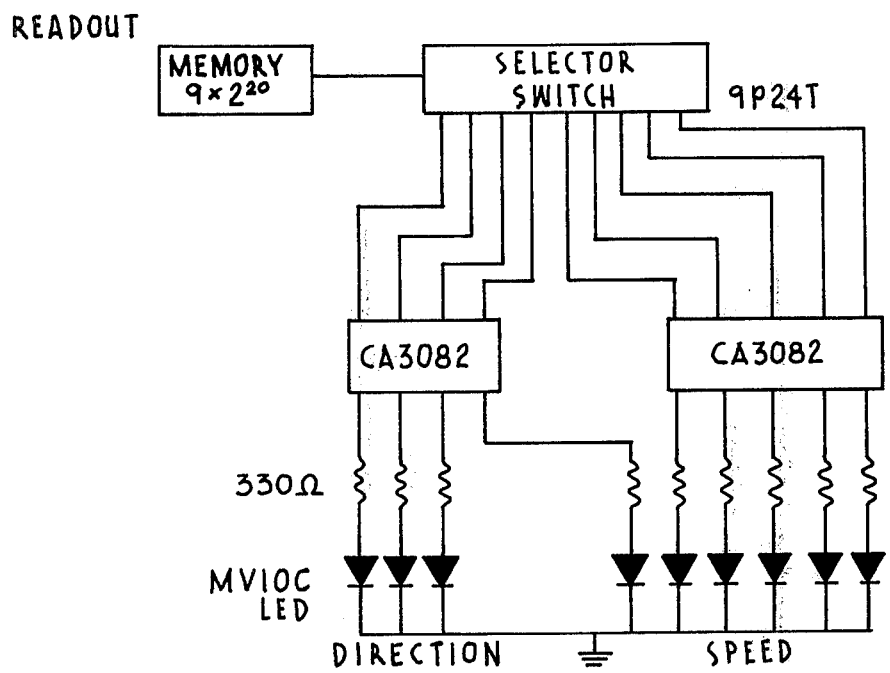

Readout from the memory is diagrammed in FIG. 7. The selector switch 9P24T connects the selected binary outputs from each cell to the CA 3082 transistor circuits which operate as emitter followers. The MV10C light emitting diodes (LED's) illuminate at the presence of a 1 in the binary count; the readout may also be punched on cards if desired.

Figure 8:
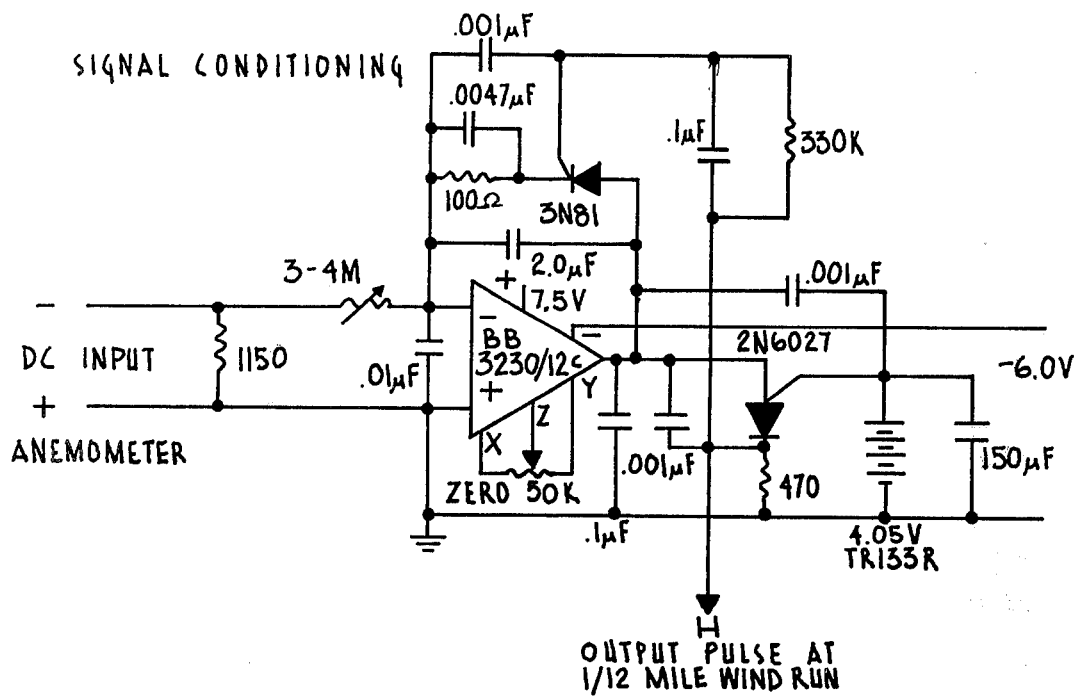

If signal conditioning of the wind speed sensor signal is necessary, it can be provided with a signal conditioner placed between the sensor and the reset and timer control. Signal conditioning circuitry for a typical voltage-generating type anemometer is shown in FIG. 8. The negative voltage produced by the anemometer is integrated in a linear manner by the 2.0μF capacitor connected from the output to the negative input of the operational amplifier (3230/12C). The programmable unijunction transistor 2N6027 compares the positive output voltage of the amplifier with a reference voltage from the 4.05v battery. When the integrated output from the amplifier exceeds the firing voltage of the 2N6027 transistor, the transistor turns on, firing the 3N81 silicon-controlled switch which in turn discharges the integrating capacitor (2.0μF). This discharge provides the pulse H for input to the reset and timer control. The amount of wind travel used as the basic unit for measurement depends on the timing of the pulses from the signal conditioner. This time, and therefore the base unit of wind travel, may be varied by selection of the integrating capacitor and the series input resistance (3-4M).

In the normal operating mode the readout portion of the device is inactive. Under these conditions, power dissipation in the device is approximately 15 milliwatts (7.5v × .002A) with the majority of this consumed in the oscillator circuit. An improved oscillator, described in RCA Application Note ICAN-6539, reduces power consumption by approximately a factor of 10 or to approximately 1.5 milliwatts. Referring to FIG. 2, this RCA oscillator replaces all of the diagrammed oscillator circuit (all circuitry to the left of line ZZ).

Having described my invention, I claim:

1. An apparatus capable, at a selected location and employing a preselected distance increment of fluid travel as a basis, of cumulatively and continuously measuring, storing, and indicating the average speed during and the direction existent at the end of each of said measured increments of fluid travel, said average speed being measured and indicated within the appropriate member of a plurality of preselected speed classes, each speed class encompassing a preselected span of speeds, and said direction being measured and indicated within the appropriate member of a plurality of preselected direction classes, each direction class encompassing a preselected span of directions, and said apparatus in addition capable of cumulatively and continuously measuring, storing, and indicating, based on said preselected distance increments of fluid travel, the average speed in each of a plurality of preselected direction classes, said average speed being measured and indicated within the appropriate member of a plurality of preselected speed classes, each speed class encompassing a preselected span of speeds, and each of said direction classes encompassing a preselected span of directions, said apparatus comprised of the following components together with associated circuitry, each component recited as means plus function:

1. fluid motion sensing means adapted to accept as mechanical input, the movement of an ambient fluid over a preselected distance increment of fluid travel and to generate from said input of fluid motion electronic output signals related to the speed of the moving fluid, said sensing means additionally adapted to respond to changes of direction of the fluid in motion, accept the changes of direction as input and mechanically operate circuit switches to implement selection of the appropriate member of a plurality of preselected direction classes corresponding to the direction of the moving fluid;

2. means for signal conditioning adapted to accept the electrical output of the sensing means and condition this output to a form suitable for use with the following apparatus components;

3. reset and timer control means adapted to receive as input the signal from the signal conditioning means and to generate output signals coordinating and actuating operations of the velocity and direction monitoring components of the apparatus as follows;

4. a first preselected plurality of electronic gates and gate selection means adapted to separate and accept severally the fluid velocity-related output signals of the reset and timer control means for a numerically equivalent plurality of preselected velocity classes;

5. a second preselected plurality of electronic gates and gate selection means adapted to separate and accept severally the fluid direction-related output signals of the reset and timer control means for a numerically equivalent plurality of preselected directional sectors;

6. electronic memory means adapted to accumulate and store the output signals generated by means of (1) adapted by means (2), coordinated by means (3) and segregated by means (4) and means (5);

7. data display means adapted to convert the stored signals of memory means (6) above to readout.

* * * * *